US011837715B2

(12) United States Patent
Chung et al.

(10) Patent No.: US 11,837,715 B2
(45) Date of Patent: Dec. 5, 2023

(54) COMPOSITE FOR POSITIVE ELECTRODE ACTIVE MATERIAL OF SECONDARY BATTERY, SECONDARY BATTERY INCLUDING SAME, AND METHOD FOR PREPARING SAME

(71) Applicant: KOREA INSTITUTE OF SCIENCE AND TECHNOLOGY, Seoul (KR)

(72) Inventors: Kyung Yoon Chung, Seoul (KR); Ha Kyung Roh, Seoul (KR); Moeez Iqra, Seoul (KR); Eun Seong Kim, Seoul (KR); Hun-Gi Jung, Seoul (KR); Won Young Chang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 60 days.

(21) Appl. No.: 17/179,354

(22) Filed: Feb. 18, 2021

(65) Prior Publication Data

US 2022/0181604 A1  Jun. 9, 2022

(30) Foreign Application Priority Data

Dec. 3, 2020  (KR) .................. 10-2020-0167366

(51) Int. Cl.
*H01M 4/36* (2006.01)
*H01M 4/58* (2010.01)
*H01M 10/054* (2010.01)
*H01M 4/48* (2010.01)
*H01M 4/02* (2006.01)

(52) U.S. Cl.
CPC .......... *H01M 4/364* (2013.01); *H01M 4/483* (2013.01); *H01M 4/582* (2013.01); *H01M 10/054* (2013.01); *H01M 2004/028* (2013.01)

(58) Field of Classification Search
CPC ........................... H01M 4/364; H01M 4/366
See application file for complete search history.

(56) References Cited

U.S. PATENT DOCUMENTS

| 2015/0255830 A1* | 9/2015 | Matsui ............... H01M 4/364 429/339 |
| 2017/0104204 A1* | 4/2017 | Zhamu ............... H01M 10/054 |
| 2017/0207500 A1* | 7/2017 | Amine ............... H01M 4/485 |

FOREIGN PATENT DOCUMENTS

| JP | 2013030463 A * | 2/2013 | .......... H01M 10/052 |
| KR | 101084975 B1 | 11/2011 | |
| KR | 101121557 B1 | 3/2012 | |
| KR | 101617484 B1 | 5/2016 | |

* cited by examiner

*Primary Examiner* — Stephan J Essex
(74) *Attorney, Agent, or Firm* — Rabin & Berdo, P.C.

(57) ABSTRACT

The present disclosure provides a composite wherein NaCl nanoparticles are uniformly dispersed on reduced graphene oxide (rGO), a positive electrode active material including the same, a sodium secondary battery including the same, and a method for preparing the same. The positive electrode active material according to the present disclosure has a structure wherein NaCl nanoparticles are uniformly dispersed on rGO in a one-step process through chemical self-assembly. Therefore, the positive electrode active material according to the present disclosure exhibits superior electrochemical properties with high capacity because the small NaCl particles are dispersed uniformly and is economically favorable because the preparation process is simple.

4 Claims, 6 Drawing Sheets

COMPOSITE FOR POSITIVE ELECTRODE ACTIVE MATERIAL OF SECONDARY BATTERY, SECONDARY BATTERY INCLUDING SAME, AND METHOD FOR PREPARING SAME

CROSS-REFERENCE TO RELATED APPLICATIONS

This application claims priority under 35 U.S.C. § 119 to Korean Patent Application No. 10-2020-0167366 filed on Dec. 3, 2020 in the Korean Intellectual Property Office, the disclosure of which is incorporated herein by reference in its entirety.

TECHNICAL FIELD

The present disclosure relates to a composite for a positive electrode active material of a secondary battery, secondary battery including the same, and a method for preparing the same.

BACKGROUND

Recently, interests in energy storage technology are increasing. As the applications are expanded to mobile phones, camcorders, notebook PCs and electric vehicles, research and development efforts on electrochemical devices are bearing fruit gradually. Electrochemical devices are at the center of attention in this regard. Particularly, the development of rechargeable secondary batteries is drawing a lot of attentions. Recently, the design of new electrodes and batteries for improving charge-discharge capacity is being studied.

Although a lithium-ion (Li-ion) battery occupies the mainstream of the secondary battery technology in research and development and commercialization, rapid price increase is expected if the battery market grows rapidly, due to the limited and localized lithium resources. In addition, there are risks of stability, leakage, etc. because the lithium-ion battery uses a combustible organic electrolyte, as well as firing caused by temperature increase due to increased discharge rate because of the limitation in energy density. Accordingly, for use in electric vehicles and energy storage systems, a new secondary battery, which exhibits high stability, high capacity and long life while being inexpensive, is necessary.

A sodium-ion (Na-ion) battery is being researched as one of the secondary batteries that can replace the lithium-ion battery. In particular, it is being developed actively as a "post Li-ion battery" in Japan. When compared with lithium, sodium is about 33 times less expensive, has a standard electrode potential of about 0.3 V, has an ion volume of about 2.4 times, has an atomic weight of about 3.3 times, and has a theoretical capacity of about 3.2 times lower. Accordingly, the sodium secondary battery is advantageous in that it has excellent competitiveness in terms of material availability and manufacturing cost, because globally abundant sodium is used, and a high-capacity battery can be prepared with a simple structure as compared to the lithium-ion battery.

However, the sodium secondary battery has a weak point as an electricity storage device because the transport of sodium ions between electrodes is difficult due to larger ion size and weight compared to lithium ions. Accordingly, in the development of a sodium-ion battery, it is important to select a chemical reaction suitable for sodium in atomic level. NaCl, which is reported as a positive electrode active material of the existing sodium battery, lowers electrode efficiency since the supply of electrons is not effective due to low electrical conductivity. Accordingly, development of a technology for increasing the electrical conductivity of a positive electrode active material is needed more than ever before.

Meanwhile, graphene is drawing attentions as a material for the future industry due to remarkably superior intrinsic properties such as high electrical conductivity, large specific surface area, etc., as compared to the existing carbon-based materials. In addition, graphene nanocomposite materials are highlighted as future materials capable of replacing existing materials in various fields such as catalysts, electronic materials, energy storage materials, biomedical materials, etc. due to excellent physical properties of graphene. For this reason, a lot of research groups around the world are working hard to develop a superior graphene-based nanocomposite material synthesis technology.

REFERENCES OF THE RELATED ART

Patent Documents

1. Korean Patent Publication No. 10-2010-0136576.
2. Korean Patent Publication No. 10-2011-0127363.
3. Korean Patent Publication No. 10-2011-0039568.

SUMMARY

The present disclosure is directed to providing a composite wherein NaCl nanoparticles are uniformly dispersed on reduced graphene oxide (rGO), a positive electrode active material including the same, a sodium secondary battery including the same, and a method for preparing the same.

In particular, the present disclosure is directed to providing a positive electrode active material with excellent reversibility and charge-discharge capacity through a simple process, and a sodium secondary battery including the same.

An aspect of the present disclosure relates to a NaCl-rGO composite for a positive electrode active material of a sodium secondary battery, wherein NaCl nanoparticles are dispersed on rGO.

Another aspect of the present disclosure relates to a positive electrode active material for a sodium secondary battery, which includes the NaCl-rGO composite according to an exemplary embodiment of the present disclosure.

Another aspect of the present disclosure relates to a sodium secondary battery including the NaCl-rGO composite according to an exemplary embodiment of the present disclosure as a positive electrode active material.

Another aspect of the present disclosure relates to an energy storage device, a transportation device, a communication device, etc. including the NaCl-rGO composite according to an exemplary embodiment of the present disclosure.

Another aspect of the present disclosure relates to a method for preparing a NaCl-rGO composite, which includes (B) a step of heat-treating a mixture solution containing graphene oxide (GO), NaCl and a reducing agent, (C) a step of obtaining a 3D-structured gel by evaporating a solvent or a dispersion medium from the mixture solution, (D) a step of freeze-drying the gel, and (E) a step of post-heat-treating the freeze-dried gel.

The positive electrode active material according to the present disclosure has a structure wherein NaCl nanoparticles are uniformly dispersed on rGO in a one-step process through chemical self-assembly. Therefore, the positive electrode active material according to the present disclosure exhibits superior electrochemical properties with high capacity because the small NaCl particles are dispersed uniformly and is economically favorable because the preparation process is simple.

DETAILED DESCRIPTION OF EMBODIMENTS

Hereinafter, several aspects and various exemplary embodiments of the present disclosure are described in more detail.

An aspect of the present disclosure relates to a NaCl-rGO composite for a positive electrode active material of a sodium secondary battery, wherein NaCl nanoparticles are located on rGO.

The existing sodium battery has the problem in that NaCl, which has been reported as a positive electrode active material, lowers electrode efficiency because electron transport is not effective due to low electrical conductivity.

In addition, since the existing technology about NaCl/rGO mixture or composite involves the preparation of a porous carbon structure by removing a NaCl template through washing with water and remaining rGO only, the NaCl/rGO composite according to the present disclosure is clearly distinguished from the prior art not only in use as a positive electrode active material but also in the composite itself.

According to the present disclosure, a carbon material with superior electrical conductivity is introduced to confer conductivity to pristine NaCl which has poor electrical conductivity. Particularly, by forming a composite by introducing rGO, which has electrochemical activity in the charge-discharge range of a sodium battery of 0.1-4.23 V (vs. Na/Na$^+$), not only NaCl but also rGO can act as a positive electrode active material. Accordingly, superior charge-discharge capacity may be achieved together with high specific capacity.

According to an exemplary embodiment, the NaCl nanoparticles have an average particle diameter of 100-200 nm.

Figure 1A:
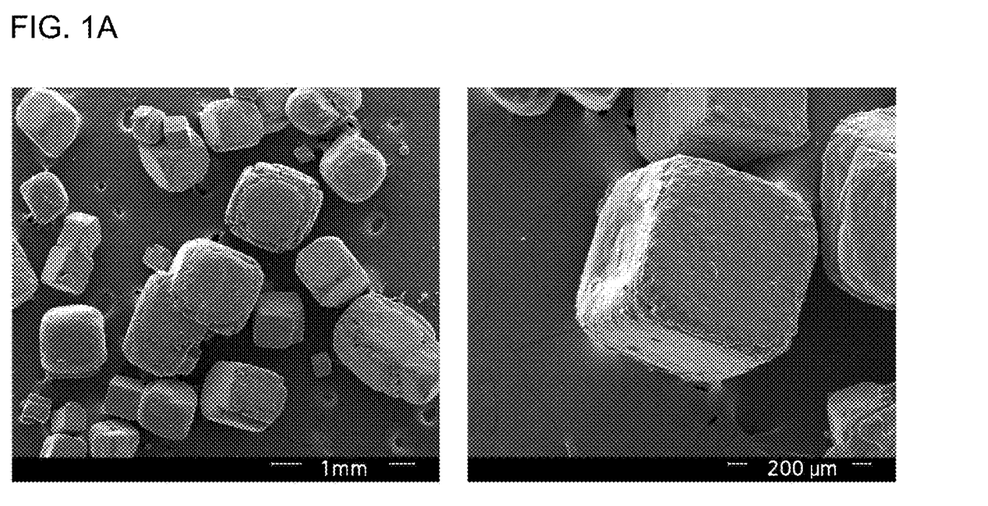
FIG. 1A shows field-emission scanning electron microscopy (FE-SEM) images of NaCl particles commercially available from Sigma Aldrich at low magnification (left) and high magnification (right).

NaCl, which has been reported as a positive electrode active material of the existing sodium battery, usually has a particle diameter ranging from about 100 μm to about 500 μm. From the field-emission scanning electron microscopy (FE-SEM) images of commercially available NaCl particles (Sigma Aldrich) shown in FIG. 1A, it can be seen that the NaCl particles have a particle diameter ranging from about 100 μm to about 500 μm.

In the NaCl-rGO composite according to the present disclosure, very small NaCl particles of about 100-200 nm are formed on rGO sheet. Since electrochemical reactions occur on surface in general, the sites for electrochemical reactions are increased as the particle diameter of the active material is smaller due to increased effective specific surface area for electrochemical reactions. Therefore, according to the present disclosure, the specific capacity of NaCl particles can be increased further due to the very small average particle diameter.

In particular, in the composite of the present disclosure, the NaCl nanoparticles may have an average particle diameter of specifically 100-200 nm. It has been confirmed through TEM analysis that some of the NaCl nanoparticles may aggregate or be formed nonuniformly on the rGO sheet if the average particle diameter is outside the above range.

According to another exemplary embodiment, the loading amount of NaCl in the NaCl/rGO composite as determined by thermogravimetric analysis is 85-95%. It has been confirmed that, if the loading amount of NaCl the composite according to the present disclosure as determined by thermogravimetric analysis is outside the above range, satisfactory electrochemical properties cannot be achieved or some of the NaCl nanoparticles may aggregate or be formed nonuniformly on the rGO sheet.

According to another exemplary embodiment, the NaCl-rGO composite does not show an effective peak at 2θ of from 10.1° to 10.5° but shows an effective peak at 2θ of from 24° to 26° in X-ray diffraction (XRD) analysis.

According to another exemplary embodiment, the NaCl-rGO composite shows a first effective peak at 284.4-284.8 eV, a second effective peak at 285.9-286.3 eV, a third effective peak at 286.8-287.2 eV and a fourth effective peak at 288.2-288.6 eV in X-ray diffraction (XRD) analysis.

In the present disclosure, the effective (or significant) peak refers to a peak detected repeatedly with substantially the same pattern in XRD data without being significantly affected by analysis conditions or performers. In other words, it refers to a peak having a height, intensity, strength, etc. of 1.5 times or greater, specifically 2 times or greater, more specifically 2.5 times or greater, as compared to the background level.

As a result of energy-dispersive X-ray spectroscopy (EDS) analysis for NaCl/rGO composites according to various exemplary embodiments of the present disclosure, it has been found out that Na, Cl, C and O elements are present uniformly on the composites. Through this, it was confirmed that the elements are composited uniformly rather than being simply mixed.

In addition, from transmission electron microscopy (TEM) imaging analysis of NaCl/rGO composites according to various exemplary embodiments of the present disclosure at low magnification (FIG. 1C, left) and high magnification (FIG. 1C, center), it was confirmed that NaCl nanoparticles, particularly NaCl nanoparticles with a particle diameter of about 100-200 nm, are stably dispersed on rGO sheet. Also, ring patterns were observed in selected area electron diffraction (SAED) analysis (FIG. 1C, right). Through this, it was confirmed that the NaCl/rGO composites according to various exemplary embodiments of the present disclosure has a polycrystalline structure.

Another aspect of the present disclosure relates to a positive electrode active material for a sodium secondary battery, which includes the NaCl-rGO composite according to various exemplary embodiments of the present disclosure.

Another aspect of the present disclosure relates to a sodium secondary battery including the NaCl-rGO composite according to various exemplary embodiments of the present disclosure as a positive electrode active material.

Another aspect of the present disclosure relates to a device such as an energy storage device, a transportation device, a communication device, etc., which includes the NaCl-rGO composite according to various exemplary embodiments of the present disclosure. However, the device is not limited to those listed above.

Another aspect of the present disclosure relates to a method for preparing a NaCl-rGO composite, which includes (B) a step of heat-treating a mixture solution containing graphene oxide (GO), NaCl and a reducing agent, (C) a step of obtaining a 3D-structured gel by evaporating a solvent or a dispersion medium from the mixture solution, (D) a step of freeze-drying the gel, and (E) a step of post-heat-treating the freeze-dried gel.

In the step (B), as the mixture solution containing the reducing agent is heat-treated, graphene oxide is reduced by the reducing agent and a NaCl/rGO composite is formed.

The reducing agent used in the step (B) reduces the functional groups present on the surface of graphene oxide, such as a carboxyl group (—COOH), a formyl group (—CHO), a carbonyl group (—CO—), etc. to water ($H_2O$).

According to an exemplary embodiment of the present disclosure, any one that can reduce the functional groups on the surface of graphene oxide to water may be used as the reducing agent. Specifically, ascorbic acid ($C_6H_8O_6$), sodium sulfide ($Na_2S$), hydrogen iodide (HI), sodium bisulfite ($NaHSO_3$), a mixture of two or more of them, etc. may be used, although not being limited thereto.

While the graphene oxide is reduced, hydration may occur on the surface of reduced graphene oxide (rGO) by the functional group present on the surface of graphene oxide, such as a carboxyl group (—COOH). In the hydrated state, $sp^2$ bonding is restored between the carbon atoms constituting graphene oxide, and a 3D gel having pores may be formed as $\pi$-$\pi$ bonding is formed from the restored $sp^2$ bonding.

According to another exemplary embodiment, the heat treatment is performed at 70-90° C. for 10-14 hours.

The freeze-drying step (D) is a very important step in the determination of the size of NaCl particles. The size of the NaCl particles changes greatly depending on the presence or absence of the freeze-drying. That is to say, whereas NaCl particles with a size of hundreds of nanometers were synthesized when post-heat treatment was conducted after freeze-drying as in the present disclosure, particles with a size of 2-3 μm were formed when post-heat treatment was performed without freeze-drying (FIG. 1D). The increase in particle size is undesirable because the deterioration of electrochemical properties may be caused.

In particular, it was confirmed that impurities that may induce the deterioration of electrochemical properties by acting as a resistor during electrochemical reactions were not synthesized (secondary phase was not observed in XRD analysis) when post-heat treatment was conducted after freeze-drying at −100° C. to −10° C.

More specifically, it was confirmed that, when post-heat treatment was conducted after freeze-drying at −60° C. to −40° C., NaCl particles with a size of 100-200 nm were synthesized as desired by the present disclosure and some of the NaCl nanoparticles were aggregated or formed nonuniformly on the rGO sheet.

The post-heat treatment step (E) is a step wherein the reducing agent remaining in the synthesized NaCl/rGO composite is carbonized. The reducing agent is converted to amorphous carbon through high-temperature heat treatment (e.g., 700° C., 1 hour) under inert atmosphere (e.g., argon gas). Whereas the reducing agent acts as a resistor if it remains in the final composite because it lacks electrical conductivity, the amorphous carbon can improve electrochemical properties because it has electrical conductivity.

According to another exemplary embodiment, the post-heat treatment is performed under inert atmosphere at 650-750° C. for 0.5-4 hours, more specifically at 680-720° C. for 0.8-1.2 hours.

According to another exemplary embodiment, (A) a step of obtaining the mixture solution of the step (B) by mixing a dispersion of graphene oxide with a solution comprising NaCl and a reducing agent is further included prior to the step (B).

In the step (A), the dispersion of graphene oxide may be obtained by dispersing a graphene oxide powder in a solvent or a dispersion medium. As the solvent or dispersion medium, water or an organic solvent may be used either alone or in combination.

As the organic solvent, a polar or nonpolar solvent may be used. Specifically, one or more of methanol, ethanol, propanol, pentane, methylpropanone, butanone, trimethylpentane, fluoroalkane, hexane, cyclohexane, cyclopentane, pentene, benzene, toluene, xylene, chloropropane, chlorobenzene, bromoethane, diethyl ether, diisopropyl ether, diethyl sulfide, chloroform, tetrahydrofuran, dichloroethane, nitropropane, acetone, dioxane, methyl acetate, ethyl acetate, dimethyl sulfoxide, diethylamine, nitromethane, acetonitrile, pyridine, butoxyethanol, ethylene glycol and acetic acid may be used, although not being limited thereto.

According to another exemplary embodiment, the dispersion is an aqueous dispersion, the solution is an aqueous solution, and the solvent and the dispersion medium are water. Most specifically, the aqueous dispersion and the aqueous solution are water since the dispersibility of graphene oxide is best in water.

According to another exemplary embodiment, a mixing weight ratio of the graphene oxide and the NaCl is 1:10-15, specifically 7-17, more specifically 1:10-15, most specifically 1:11-13. Particularly, when the mixing weight ratio of the graphene oxide and the NaCl is within the above-described ranges, no aggregation or nonuniform forming of NaCl nanoparticles on rGO sheet was observed in TEM analysis.

Hereinafter, the present disclosure will be described in more detail through examples, etc. However, it is not to be construed that the contents and scope of the present disclosure are reduced or limited by the following examples, etc. In addition, it is evident that those of ordinary skill can easily carry out the present disclosure based on the disclosure of the present disclosure including the following examples, even for the matters for which specific experimental data are not presented, and it is obvious that such changes and modifications belong to the scope of the appended claims.

Hereinafter, only representative experimental results for examples and comparative examples are provided.

EXAMPLES

Example 1

A dispersion wherein graphene oxide is dispersed uniformly was prepared by adding 10 g of an aqueous solution of commercially available graphene oxide (Angstron Materials, N002-PS, 2%) to 100 mL of distilled water and sonicating for 90 minutes.

After mixing the prepared dispersion with 2.4 g of NaCl powder (Sigma Aldrich) and stirring for 10 minutes, 0.4 g of ascorbic acid was added as a reducing agent and the mixture was heat-treated in an oven at 80° C. for 12 hours.

Then, a 3D-structured gel was obtained by completely evaporating water. After freeze-drying the prepared gel in a freeze dryer set to −50° C. for 24 hours, a NaCl/rGO composite was obtained by conducting post-heat treatment under inert atmosphere using argon gas at 700° C. for 3 hours.

Test Example 1

The NaCl/rGO composite prepared in Example 1 was imaged by field-emission scanning electron microscopy (FE-SEM). The result is shown in FIG. 1B.

Figure 1B:
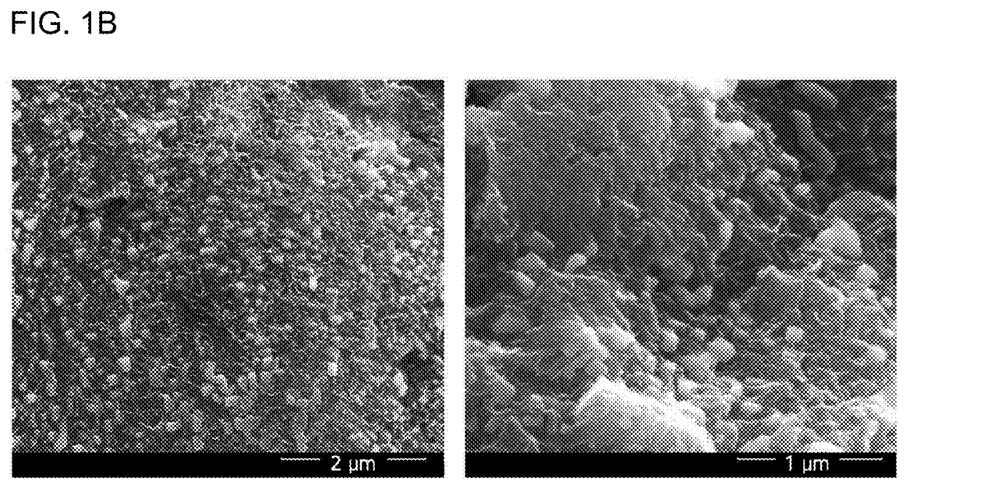
FIG. 1B shows field-emission scanning electron microscopy (FE-SEM) images of a NaCl/rGO composite according to an exemplary embodiment of the present disclosure at low magnification (left) and high magnification (right).
Figure 1C:
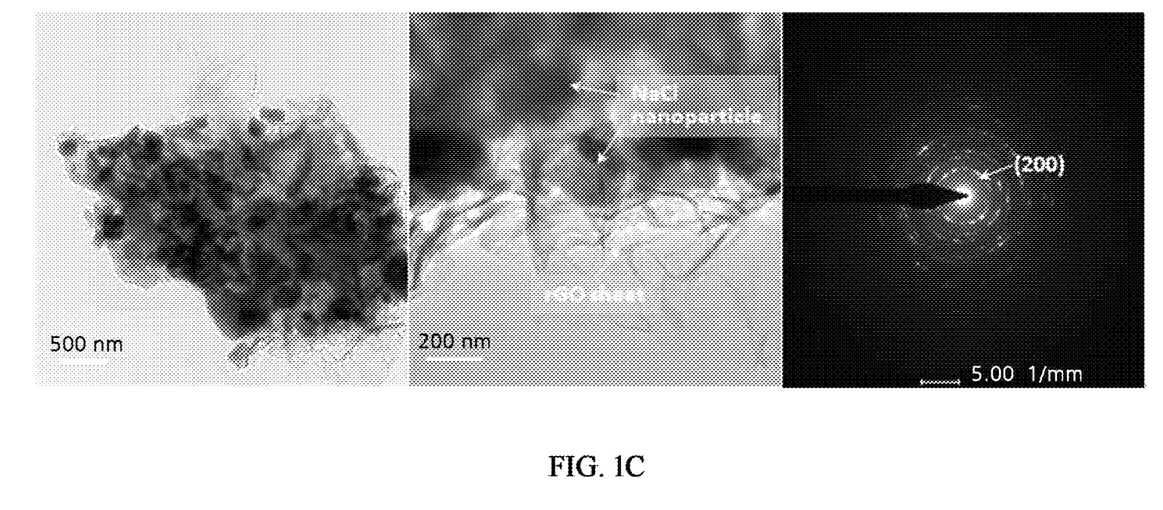
FIG. 1C shows a low-magnification TEM image (left), a high-magnification TEM image (center) and an SAED analysis result (right) of a NaCl/rGO composite according to an exemplary embodiment of the present disclosure.
Figure 1D:
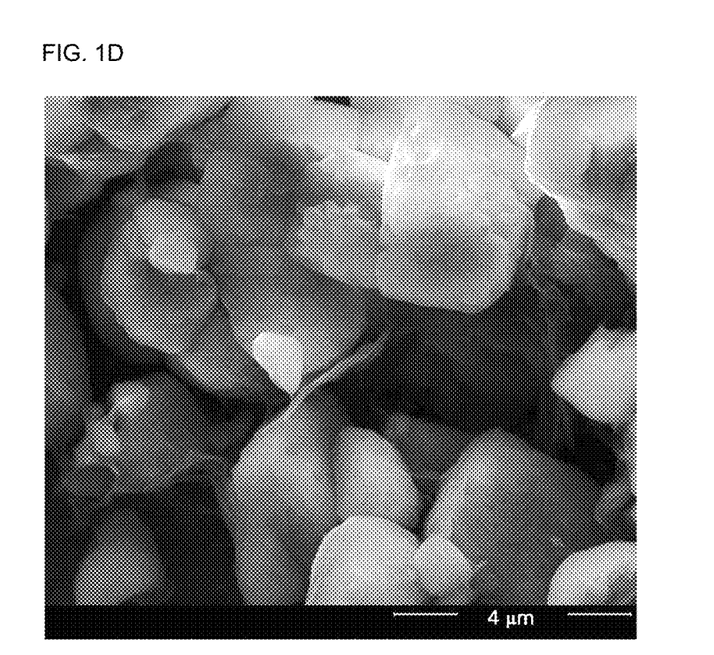
FIG. 1D shows a scanning electron microscopy (SEM) image of a NaCl/rGO composite prepared by post-heat treatment without freeze drying.

As seen from FIG. 1B, it was confirmed that spherical NaCl particles with an average particle diameter of about 100-200 nm were immobilized on the surface of graphene.

Test Example 2

X-ray diffraction (XRD) analysis was conducted for the NaCl/rGO composite prepared in Example 1. The result is shown in FIG. 2.

Figure 2:
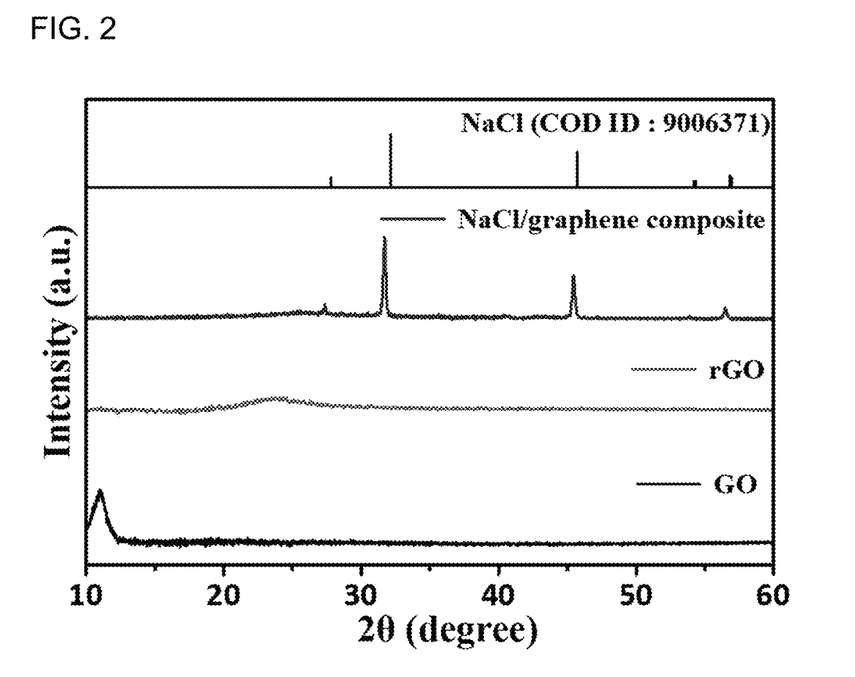
FIG. 2 shows an X-ray diffraction (XRD) analysis result of GO, rGO, NaCl and a NaCl/rGO composite according to an exemplary embodiment of the present disclosure.

As seen from FIG. 2, it was confirmed that, whereas the graphene oxide without NaCl showed a typical diffraction peak at 10.3°, the corresponding peak was not observed in the NaCl/rGO composite prepared in Example 1 and a broad diffraction peak at 25° was observed instead.

In addition, it was confirmed that the NaCl/rGO composite prepared in Example 1 corresponded to COD ID 9006371 of NaCl, suggesting that NaCl is present in the composite with no secondary phase.

Test Example 3

In order to investigate the bonding characteristics of the components of the NaCl/rGO composite prepared in Example 1, graphene oxide and the NaCl/rGO composite were analyzed by X-ray photoelectron spectroscopy (XPS). The result is shown in FIG. 3.

Figure 3A:
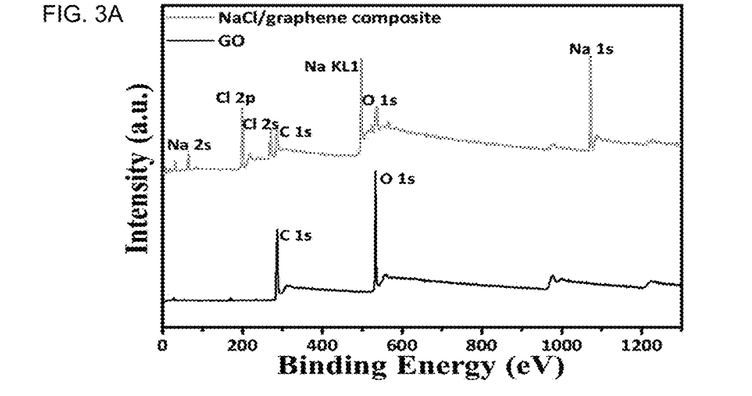
FIG. 3A shows XPS spectra of GO and a NaCl/rGO composite according to an exemplary embodiment of the present disclosure, and FIGS. 3B and 3C respectively show an X-ray photoelectron spectroscopy (XPS) analysis result for GO and a NaCl/rGO composite according to an exemplary embodiment of the present disclosure.
Figure 3B:
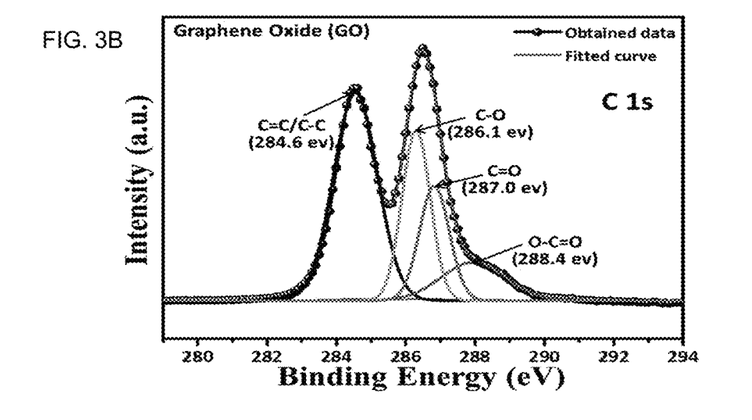
Figure 3C:
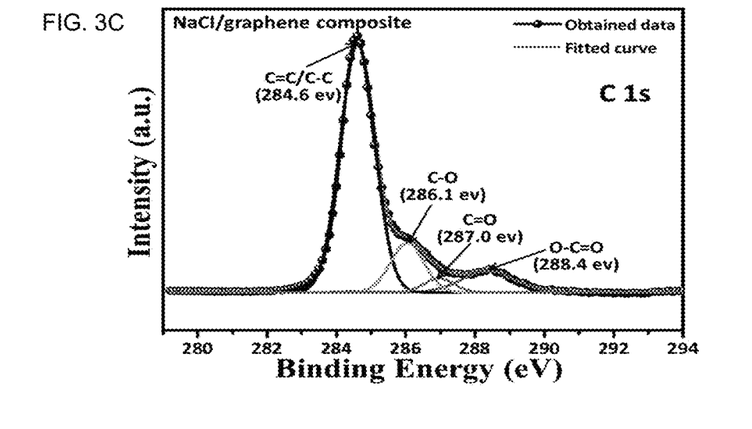

As seen from FIG. 3, C—C orbital was identified at 284.6 eV and C—O, C=O and O—C=O functional groups on the surface were identified at 286.1 eV, 287.0 eV and 288.4 eV, respectively. It was confirmed that the intensity of the main peak of graphene oxide without NaCl at 286.1 eV was reduced in the NaCl/rGO composite according to the present disclosure, which was prepared by mixing graphene oxide and NaCl at a weight ratio of 1:12.

In addition, it was confirmed that the intensity of the C—C peak was increased, suggesting that electrochemical properties were improved.

Test Example 4

Thermogravimetric analysis was performed on the NaCl/rGO composite prepared in Example 1 for investigation of NaCl content in the composite. Specifically, weight was measured while heating the NaCl/rGO composite under air atmosphere from 30° C. to 800° C. at a rate of 10° C./min. The result is shown in FIG. 4.

Figure 4:
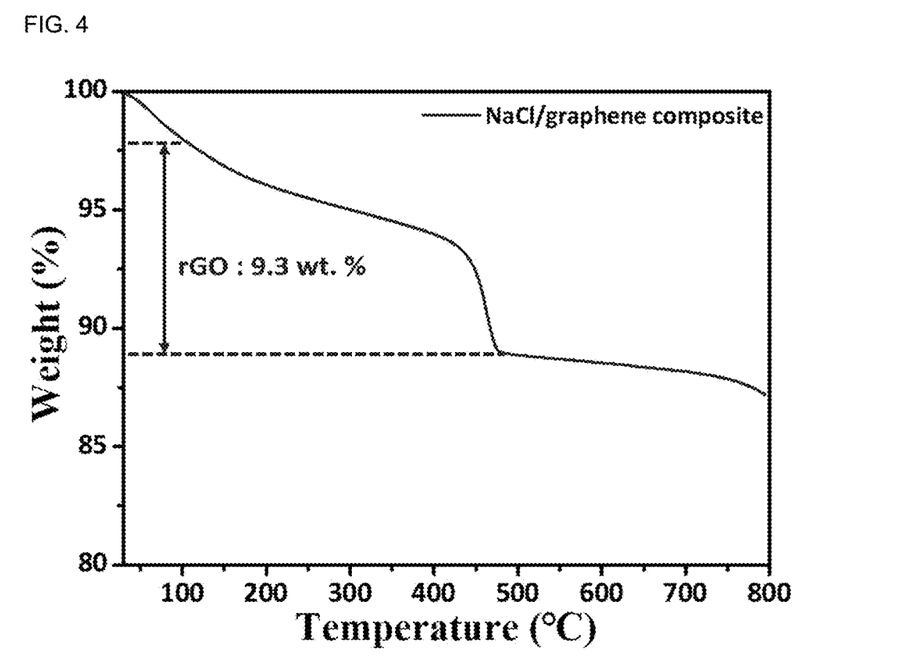
FIG. 4 shows a result of thermogravimetric analysis for a NaCl/rGO composite according to an exemplary embodiment of the present disclosure.

As seen from FIG. 4, the loading amount of NaCl was confirmed to be about 91% since carbon loss in the composite was about 9.3%.

Test Example 5

For analysis of the electrochemical properties of the NaCl/rGO composite prepared in Example 1 as a positive electrode active material, the charge-discharge capacity and discharge retention were evaluated with a half-cell using the prepared NaCl/rGO composite positive electrode active material as a sodium-ion battery material.

First, an electrode slurry was prepared by mixing 80 parts by weight of the NaCl/rGO composite prepared in Example 1 as a positive electrode active material, 10 parts by weight of polyvinylidene fluoride (PVDF) as a binder and 10 parts by weight of carbon black as a conducting material and adding the mixture to N-methyl-2-pyrrolidone (NMP). And electrode was prepared by coating 2-3 mg of the electrode slurry on an aluminum current collector and then drying the same.

Sodium metal was used as a reference electrode and a counter electrode. As an electrolyte, a 1 M solution of sodium perchlorate ($NaClO_4$) dissolved in a 98:2 (v/v) mixture solvent of propylene carbonate (PC) and fluoroethylene carbonate (FEC) was used.

Charge-discharge testing was performed using a potentiostat/galvanostat in a voltage range of 0.1-4.23 V, and the charge-discharge rate was measured at a C-rate of 0.03. The result is shown in FIG. 5.

Figure 5:
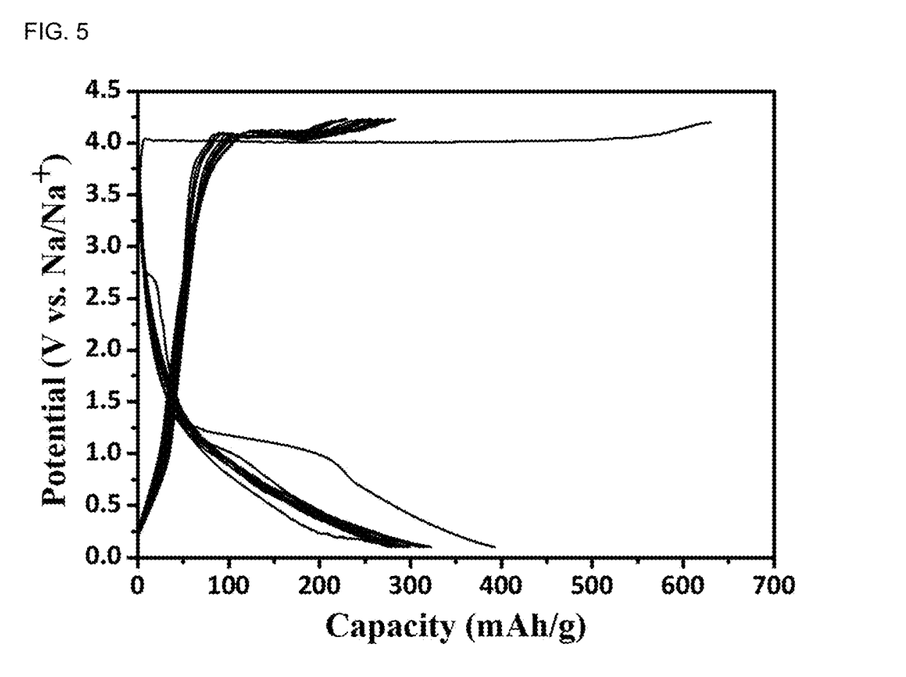
FIG. 5 shows a result of a charge-discharge experiment of a NaCl/rGO composite positive electrode active material according to an exemplary embodiment of the present disclosure at a C-rate of 0.05.

FIG. 5 shows the capacity of the electrode including the positive electrode active material prepared in Example 1 per unit weight of the electrode. When the charge-discharge rate was 0.05 C, the initial discharge capacity was 400 mAh/g. This charge-discharge capacity is very superior, close to the theoretical capacity of 458 mAh/g.

In addition, charging and discharging were repeated for 13 cycles for the prepared electrode at a C-rate of 0.03. The result is shown in FIG. 6.

Figure 6:
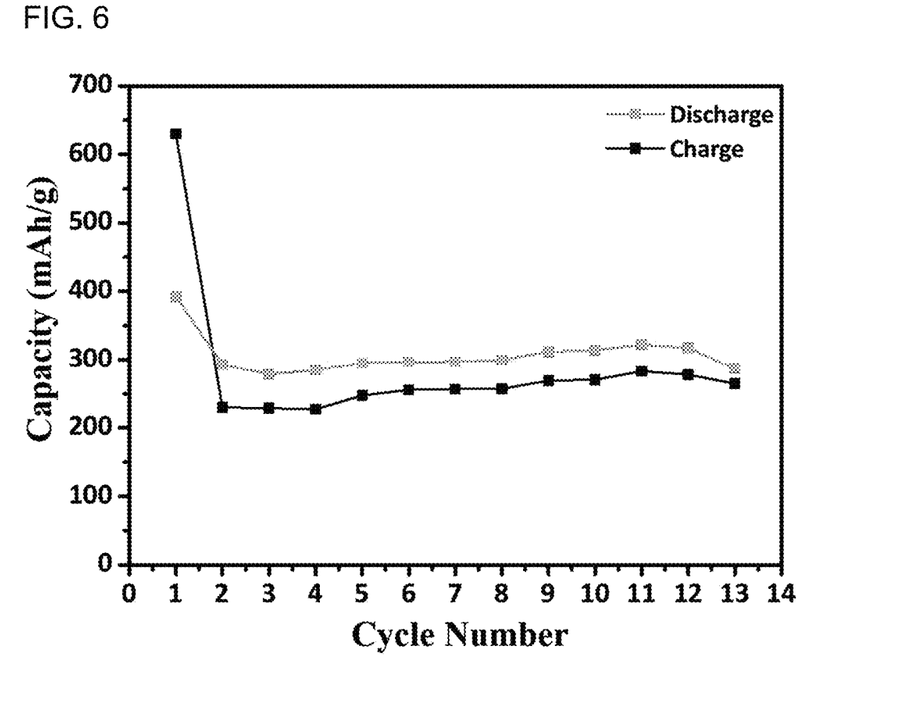
FIG. 6 shows the cycle characteristics of a NaCl/rGO composite positive electrode active material according to an exemplary embodiment of the present disclosure in a voltage range of 0.1-4.23 V (vs. Na/Na$^+$) and at a charge-discharge rate (C-rate) of 0.05.

FIG. 6 shows the discharge retention of the electrode including the positive electrode active material prepared in Example 1. The initial discharge capacity was 400 mAh/g at a C-rate of 0.05, and the discharge capacity after 13 cycles of charge-discharge was 287 mAh/g, suggesting that the discharge capacity was maintained very superiorly at 72% of the initial discharge capacity.

What is claimed is:

1. An energy storage device, comprising:
   a sodium-ion battery comprising a positive electrode active material, wherein the positive electrode active material comprises a NaCl-rGO composite, wherein rGO refers to reduced graphene oxide, and NaCl nanoparticles are uniformly located on the rGO, wherein the NaCl nanoparticles have an average particle diameter of 100-200 nm, wherein a loading amount of NaCl in the NaCl/rGO composite as determined by thermogravimetric analysis is 85-95%.

2. The energy storage device according to claim 1, wherein the NaCl-rGO composite does not show an effective peak at 2θ of from 10.1° to 10.5° but shows an effective peak at 2θ of from 24° to 26° in X-ray diffraction (XRD) analysis.

3. The energy storage device according to claim 2, wherein the NaCl-rGO composite shows no secondary phase in X-ray diffraction (XRD) analysis.

4. The energy storage device according to claim 1, wherein the NaCl-rGO composite shows a first effective peak at 284.4-284.8 eV, a second effective peak at 285.9-286.3 eV, a third effective peak at 286.8-287.2 eV and a fourth effective peak at 288.2-288.6 eV in X-ray diffraction (XRD) analysis.

* * * * *